United States Patent [19]

Reichenberger et al.

[11] Patent Number: 4,813,415

[45] Date of Patent: Mar. 21, 1989

[54] SENSOR FOR EVALUATION OF SHOCK WAVE PULSES

[75] Inventors: Helmut Reichenberger, Eckental; Georg Naser, Zirndorf, both of Fed. Rep. of Germany

[73] Assignee: Siemens Aktiengesellschaft, Berlin and Munich, Fed. Rep. of Germany

[21] Appl. No.: 81,988

[22] Filed: Aug. 5, 1987

[30] Foreign Application Priority Data

Aug. 18, 1986 [DE] Fed. Rep. of Germany ....... 3627947

[51] Int. Cl.$^4$ .............................................. A61B 17/00
[52] U.S. Cl. .................................. 128/328; 128/24 A
[58] Field of Search ...................... 128/328, 24 A, 644, 128/630

[56] References Cited

U.S. PATENT DOCUMENTS

| | | | |
|---|---|---|---|
| 4,191,189 | 3/1980 | Barkan | 128/328 |
| 4,612,936 | 9/1986 | Yamaguchi | 128/644 |
| 4,620,545 | 11/1986 | Shene et al. | 128/24 A |
| 4,674,505 | 6/1987 | Pauli et al. | 128/328 |
| 4,685,461 | 8/1987 | Forssmann et al. | 128/328 |
| 4,702,249 | 10/1987 | de la Fonteijne | 128/328 |
| 4,715,376 | 12/1987 | Nowacki et al. | 128/24 A X |
| 4,734,611 | 3/1988 | Granz | 310/324 |

FOREIGN PATENT DOCUMENTS

| | | |
|---|---|---|
| 0211680 | 2/1987 | European Pat. Off. . |
| 3122056 | 12/1982 | Fed. Rep. of Germany ...... 128/328 |
| 3220751 | 12/1983 | Fed. Rep. of Germany . |
| 3328051 | 2/1985 | Fed. Rep. of Germany . |
| 3437976 | 4/1986 | Fed. Rep. of Germany . |

OTHER PUBLICATIONS

Lele "Production of Deep Focal Lesions by Focused Ultrasound-Current Status", *Ultrasonics*, Apr. 1976, pp. 105-112.

Breyer et al, "A Simple Device for Checking the Acoustic Beam of Ultrasonic Therapy Equipment" *Ultrasonics*, vol. 22, No. 6, Nov. 1984, pp. 285-286.

*Primary Examiner*—Lloyd L. King

[57] ABSTRACT

A sensor for determining the position of shock wave pulses of a shock wave source comprises a device for holding a metal foil in the region of focus for the shock wave source. The metal foil is held to extend perpendicular to the main propagation direction of the pulses and the incidence of the pulses on the metal foil will cause a bulge-like deformation of the material to be formed at the point of incidence. The deformation in the foil can be optically measured, for example, by evaluation in terms of location, diameter, depth, profile and volume to obtain conclusions about the position of the center of the focussed shock waves and also the power or intensity of the shock waves.

15 Claims, 1 Drawing Sheet

SENSOR FOR EVALUATION OF SHOCK WAVE PULSES

BACKGROUND OF THE INVENTION

The present invention is directed to a sensor for the evaluation of shock wave pulses that are focussed in a region of focus or at a focal point.

During the operation of a shock wave pulse, for example of a lithotriptor for the disintegration of kidney stones, a shock wave pulse is generated with the assistance of an electrical coil and such a device is disclosed in U.S. Pat. No. 4,674,505, which claims priority from German Application No. 33 28 051. During the operation of such a device, checks of the function are called for from time to time. For example, such checks relate to the position of the focus, to the pressure distribution or to the pressure amplitude of the shock wave pulse. The checks are needed after the initial installation, after remodelling and after service or given repair of the shock wave source. After, for example, replacing an acoustical lens or a reflector which focusses the shock wave pulse, a subsequent check must be carried out to see whether an identical position for the focal point is present in comparison to the situation which preceded the repair or replacement.

A shock wave sensor that can be particularly employed for lithotripsy is disclosed, for example, in German Published Application No. 34 37 976.

SUMMARY OF THE INVENTION

The invention is based on the consideration that shock wave sensors that do not allow an evaluation until after a certain time period following the influence of the shock wave pulses are also suitable as a check means for the function checks that do not take place during the ongoing therapy treatment of a patient. Shock wave indicators or sensors which allow both an immediate observation of the point of incidence of the shock wave pulses, as well as a subsequent interpretation, for example, an estimate of the integrally received energy, thus, also come into consideration for this check case. In addition to the manufacturability and the price of the check, the easy manipulatibility of the check means or sensor is of significance.

The object of the present invention is to provide a sensor for use with a shock wave device, which sensor enables checking the center point of the shock wave focus in an easy and simple manner.

This object is achieved in a sensor which comprises a thin metal foil and means for positioning the foil in the region of focus to extend perpendicular to the main propagation direction of the shock wave pulse.

An advantage of this sensor is that the position of the deformation or indenting that is caused by the incidence of the shock wave pulse can be determined by observing the front side or back side of the metal foil with the naked eye or with an optical device. The position of the deformation is a measure for the positioning of the shock wave source relative to a desired main propagation direction of the shock waves. When a marking or scale is applied to the metal foil, then a deviation from the central axis of the shock wave source can also be quantitatively identified. The sensor is largely insensitive to disruption, since electrical components such as, for example, transducers, leads, electrical contacts, etc., can be fundamentally eliminated.

The optical interpretation, i.e., the identification of the position of the deformation caused by the shock wave pulse, can occur either in situ or, on the other hand, in a separate evaluation means. Such evaluation means are known per se in the field of materials inspection. Defined quantities of the deformation such as, for example, the diameter of the deformation, the local depth, the profile and volume can be obtained with the assistance of these known means for evaluation.

By comparing the deformation to an empirically acquired calibration, for example of a mechanical gauge having a standard deformation, quantitative particulars, such as, for example, pressure or intensity of the impinging shock wave pulses and/or the indication of trends such as, for example, particulars regarding the power of the shock wave source during longer operational times, can be made for a specific shock wave source.

Other advantages will be readily apparent from the following description of the drawings, the preferred embodiment and claims.

DESCRIPTION OF THE PREFERRED EMBODIMENTS

Figure 1:
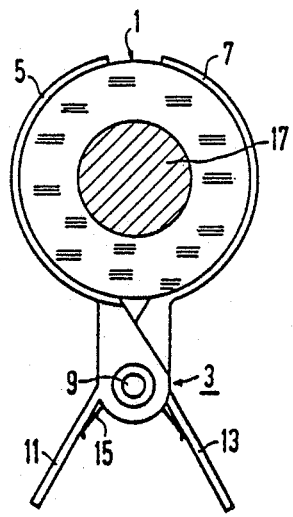
FIG. 1 is an end view of a coupling member having the integrated metal foil as a sensor in accordance with the present invention.
Figure 2:
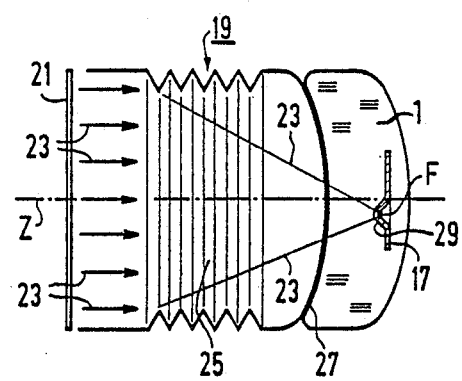
FIG. 2 is a cross sectional view of the coupling member of FIG. 1, with portions removed for purposes of illustration, as it is mounted on a shock wave tube.

The principles of the present invention are particularly useful when incorporated in a sensor, illustrated in FIGS. 1 and 2, which sensor includes a disk-shaped coupling member 1 containing a foil 17, which member 1 is attached to a shock wave generator or source 19 by securing means (not shown) and held in the shape of a disk by clamping forceps 3. The coupling member 1 is composed of an elastic, shape-stable material such as, for example, a hydrogel.

The clamping forceps 3 are constructed similar to a clothespin and essentially comprises a semicircular clamping leg 5, which has a manipulative leg 11, and a semicircular clamping leg 7, which has a manipulative leg 13. The two manipulative legs and their respective clamping legs are pivoted together on a rotational axis 9 and are urged into a clamping condition by a spreader spring 7, which acts on the two manipulative legs 11 and 13. In order to remove the coupling member 1, the two manipulative legs 11 and 13 merely have to be pressed towards one another to open the semicircular clamping legs 5 and 7.

The metal foil 17 is positioned inside of the coupling member 1. The foil 17, for example, is essentially cast in the coupling member 1 or is placed between two sub-coupling members. For example, the metal foil 17 can be secured with a fixing element (not shown) to an outer retaining element of the coupling member 1, such as to one of the clamping legs 5 or 7.

The metal foil 17 is preferably fabricated of a material having low elasticity, a high apparent yield point and a high acoustical impedance. Examples of such foils are lead foils, tin foils, copper foils or gold foils. The metal foil 17 preferably comprises a thickness of between 10 μm–200 μm. It is preferably provided with a marking or scale which, for example, are constructed of sectors and circular rings in a fashion similar to a target. The diameter of the metal foil 17 can lie in a range of 2 cm to 7 cm.

The coupling member 1 with the metal foil 17 is secured on an end of the shock wave source 19, as illustrated. The shock wave source 19 has a shock wave generator 21 for generating shock wave pulses 23. The shock wave generator is especially based on the electrodynamic principle and contains a membrane that is suddenly moved away from a flat coil when the latter is excited. After passing through an approach path 25, which can be adjusted with an accordion bellows and which path contains a focussing means (not shown in detail) for the shock wave pulse 23, the shock waves 23 are focussed, as illustrated, to pass through an out coupling membrane 27 into the adjacent coupling member 1. The coupling member 1 is dimensioned so that the region of the focal point F of the shock wave pulse 23 lies inside the coupling member 1.

The shock wave source 19 has a center line Z, which proceeds through the focal point F when the shock wave source is correctly adjusted. The center line Z is then the main propagation direction for the shock wave pulse 23 at the same time. As shown in FIG. 2, a certain mispositioning between the actual focal point F and the center line Z can occur. This amount of mispositioning must be identified.

The metal foil 17 is situated within a coupling member 1 and is positioned with the foil so that it lies centrally at the focal plane of the focal point F and extends perpendicular to the desired main propagation direction Z. Instead of a positioning precisely in the desired focus on the line Z, the center of the foil 17 can also be arranged in a closer region of focus. What is understood as focus or region F of the focus in this context is that the effective region of the shock wave pulse 23, for example, the −6 dB zone, in which the noticeable influence of the deformation of the metal foil 17 will occur. This thereby needs not necessarily be directed to a single shock wave pulse, but can include a plurality of pulses, for example, 200, which will often occur.

Upon incidence of the shock wave pulse 23, a bellying or deformation 29, or even a hole, will be formed in the metal foil 17. As a result of the tensile forces that occur in conjunction with the incidence of the shock wave pulse 23, the deformation 29 extends in a reverse direction, for example, in the direction toward the shock wave source 19. On the basis of the marking or scales applied to the metal foil 17, a deviation of the point of incidence of the shock wave pulse 23, i.e., the actual range or position of the focal point F from the center of the metal foil 17, which lies on the center line Z, as a result of positioning the foil, can be quantitative acquired.

Tests have shown that a hole can also occur in the metal foil 17, dependent on the foil material, the foil thickness and number of shock wave pulses. In a way similar to that set forth for deformation 29, such a hole can be optically evaluated.

When, for example, the focussing element of the approach path 25 of the shock wave source 19 is replaced during repair or servicing, then, due to the unit scatter in the manufacture of the focussing means, it is not impossible that the region F of the focus will lie outside of the center line Z after this repair. Such a deviation can be quantitatively determined on the basis of the deformation 29 on the metal foil 17. The service personnel is then in a position to align the replacement focussing means via adjustment elements so that the focus F again lies on the center line Z. The new adjustments can be checked with reference to a new deformation 29 that will occur during the following operation of the shock wave source 19. It can, thereby, be expedient to use a new metal foil 17, possibly with a new coupling member 1, so that the plurality of deformations 29 do not overlap on the same metal foil 17.

It is expedient to provide an evaluation means which can make statements about the diameter, the depth and the profile of the deformation 29. Such evaluation means are known per se in the field of material testing. It can also be advantageous to provide a mechanical gauge or template that is calibrated at the factory for a specific or given shock wave source 19. Given proper adjustment, the deformation 29, occurring after the repair or servicing, should be identical to the standard deformation of the template.

Deviations with respect to the diameter, the depth, the profile and the volume of the deformation 29 can be easily identified. Corrections or adjustment measures can then be performed on the shock wave source.

Figure 3:
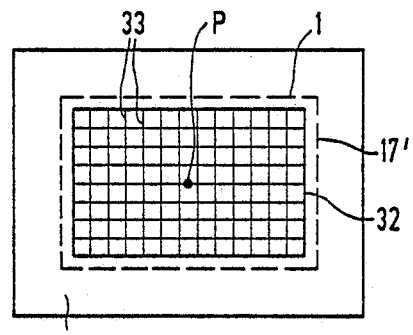
FIG. 3 is a plan view of an embodiment of a sensor comprising a metal foil clamped in a frame.

An embodiment of the sensor is illustrated in FIG. 3 and includes a rectangular metal foil 17', which is clamped in a frame 31. The frame 31 can be constructed in a fashion similar to a slide frame. The metal foil 17' is provided with a gridlike marking 33, which is composed of a plurality of a parallelextending, vertical and horizontal lines. The metal foil 17' is marked with a point P in the center of the cutout 32 of the frame 31. The frame 31 with the metal foil 17' clamped thereto is placed relative to the coupling member of the shock wave source so that the center line of the center axis of the shock wave source proceeds through the point P. Upon incidence of a plurality of shock wave pulses, the metal foil 17' deforms in the region of the focus of the shock wave pulses. A deviation between the region of the focus and the point P can be optically evaluated with reference to the markings 33. Such an evaluation can be done with the naked eye without requiring any optical equipment.

Figure 4:
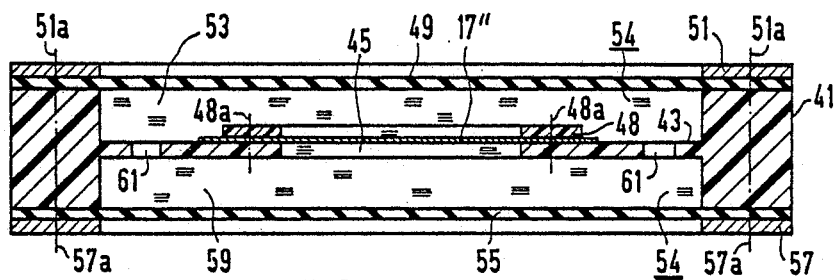
FIG. 4 is a cross sectional view of another embodiment of a sensor with a foil mounted in a flexible capsule or frame in accordance with the present invention.

Another embodiment is illustrated in FIG. 4, and utilizes a ring 41, which has a partition 43 in the middle of its inner edges and extending parallel to its two side faces. The partition 43 is provided with a central opening 45 that is covered by a metal foil 17''. The diameter of the opening 45 and, thus, the impingement area of the metal foil 17'' for the shock wave pulse amounts, for example, to about 40 mm. The ring 41 is composed of a plastic, for example, polyvinyl chloride (PVC). The metal foil 17'' is held over the central opening 45 by a clamp ring 48 so that the metal foil covers the central opening 45 in a fold-free fashion. To that end, conventional plastic screws can extend through the clamp ring 48 and into the partition 43 at the positions indicated at 48a. It should be noted that other types of fastening means can also be utilized.

A first coupling foil or coupling membrane 49 is clamped on the side face or upper surface of the ring 41 by a first retaining ring 51 having fastening elements, such as 51a. For example, the coupling foil is fabricated of rubber, preferably a EPDM rubber, having a thickness of between 1 mm and 2 mm and a diameter of about 120 mm. The coupling foil 49, which is clamped to the end face of the ring 41 by the retaining ring 51 so that it covers the inside of the ring 41 in a fold-free and slightly stretched condition.

A first, disk-like chamber 53, whose edges are defined by the ring 41, is, thus, formed between the first coupling foil 49 and one side of the partition 43, together with the metal foil 17″ on its other side. The chamber 53 is filled with a coupling agent 54 for acoustical shock waves, for example, with degasified, distilled water. An oil, for example castor oil, can also come into consideration as a coupling agent or fluid.

The configuration of the first coupling foil, the first retaining ring 51 and the first chamber 53 are also provided on the underside of the sensor device. The second coupling foil 55 is, thus, fixed there by a second retaining ring 57 being fixed against the lower surface of the ring 41 by fastening means indicated at 57a. A second chamber 59 is thus formed and this is analogous to the upper or first chamber 53 of the sensor. The second chamber 59 is filled with the coupling agent 54. The parts of the coupling foil 49 and 55 that are not clamped have a diameter of, for example, about 100 mm. The coupling foils 49 and 55 are expediently transparent in order to be able to visually evaluate the metal foil 17″ without dismantling the housing of the sensor.

The first chamber 53 is connected to the second chamber 59 by at least one, and preferably more than one, conducting openings 61 in the partition 43. A pressure equalization between the first and second chambers will occur through these openings 61. It is, thus, assured that the metal foil 17″ is arranged approximately in the middle, between the coupling foils 49 and 55, and is loaded with the same static pressure on both sides and is not unilaterally biased.

The described sensor is easy to manipulate and can be inserted as a whole into the region of focus of a shock wave generator. Despite different external conditions on both sides of the sensor, the metal foil 17″ is exposed to a defined situation. The easy manipulability and the simple evaluation of the bulge-like deformation 29 in the metal foil, such as 17″, due to the impinging shock wave pulses, are the same as in the embodiments previously described.

It can be expedient to clamp the metal foil 17″ in a mechanism that is constructed like a slide. The slide, together with the metal foil can be introduced through a suitable opening provided in the ring 41, and then can in turn be removed for visual inspection or for replacement.

Although various minor modifications may be suggested by those versed in the art, it should be understood that we wish to embody within the scope of the patent granted hereon all such modifications as reasonably and properly come within the scope of our contribution to the art.

We claim:

1. A sensor for evaluating shock wave pulses that extend in a main propagation direction and are focussed in a region of focus, said sensor comprising a thin metal foil, which is plastically shapeable under the influence of shockwave pulses, and means for positioning said foil in said region of focus to extend perpendicular to the main propagation direction of the shock wave pulses.

2. A sensor according to claim 1, wherein the metal foil is composed of a material having a low elasticity, a high apparent yielding point and a high acoustical impedance.

3. A sensor according to claim 1, wherein the metal foil is a lead foil.

4. A sensor according to claim 1, wherein the metal foil is a tin foil.

5. A sensor according to claim 1, wherein the metal foil is a copper foil.

6. A sensor according to claim 1, wherein the metal foil is a gold foil.

7. A sensor according to claim 1, wherein the metal foil has a thickness in the range of 10 $\mu$m and 200 $\mu$m.

8. A sensor according to claim 1, wherein the means for positioning includes a frame in which the metal foil is clamped.

9. A sensor according to claim 1, wherein the metal foil has a diameter in a range of 2 cm to 7 cm.

10. A sensor according to claim 1, wherein said foil can be inserted into a template for evaluating deformations formed thereon.

11. A sensor according to claim 1, wherein the foil is provided with markings to provide reference points for determining the deviation of the point of incidence of the shock wave from a center point on the metal foil.

12. A sensor for evaluating shock wave pulses that extend in a main propagation direction and are focussed in a region of focus, said sensor comprising a thin metal foil and means for positioning said foil in said region of focus to extend perpendicular to the main propagation direction of the shock wave pulses, said means for positioning including an elastic, shape-stable material in which the foil is embedded.

13. A sensor according to claim 12, wherein said material is a hydrogel.

14. A sensor for evaluating shock wave pulses that extend in a main propagation direction and are focussed in a region of focus, said sensor comprising a thin metal foil and means for positioning said foil in said region of focus to extend perpendicular to the main propagation direction of the shock wave pulses, said means for positioning being a frame-like housing having elastic membranes forming a chamber containing a coupling agent and means for mounting the foil in the center of said chamber of coupling agents.

15. A sensor according to claim 14, wherein the means for mounting includes said housing having a center partition having an opening with the foil secured across said opening.

* * * * *